(12) United States Patent
Wellbrock et al.

(10) Patent No.: US 8,630,547 B2
(45) Date of Patent: Jan. 14, 2014

(54) ENHANCED POLARIZATION MODE DISPERSION OF OPTICAL CHANNELS

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 654 days.

(21) Appl. No.: 12/268,481

(22) Filed: Nov. 11, 2008

(65) Prior Publication Data

US 2010/0119224 A1 May 13, 2010

(51) Int. Cl.
*H04B 10/00* (2013.01)
(52) U.S. Cl.
USPC ............................ 398/162; 398/140; 398/147
(58) Field of Classification Search
USPC ....................................................... 398/162
See application file for complete search history.

(56) References Cited

U.S. PATENT DOCUMENTS

| | | | |
|---|---|---|---|
| 2003/0044108 A1* | 3/2003 | Jacobowitz et al. | 385/24 |
| 2004/0052522 A1 | 3/2004 | Fishteyn et al. | |
| 2006/0110092 A1 | 5/2006 | Ikeda | |
| 2007/0009259 A1 | 1/2007 | Dragovic et al. | |
| 2007/0230855 A1 | 10/2007 | McDonald et al. | |
| 2007/0280681 A1* | 12/2007 | Frankel et al. | 398/5 |

* cited by examiner

*Primary Examiner* — Xinning Niu

(57) ABSTRACT

A device receives, from an optical receiver, performance information associated with an optical channel generated by an optical transmitter, and determines, based on the received performance information, a wavelength that minimizes polarization mode dispersion (PMD) associated with the optical channel. The device also provides, to the optical transmitter, a request to adjust an optical channel wavelength to the determined wavelength.

20 Claims, 12 Drawing Sheets

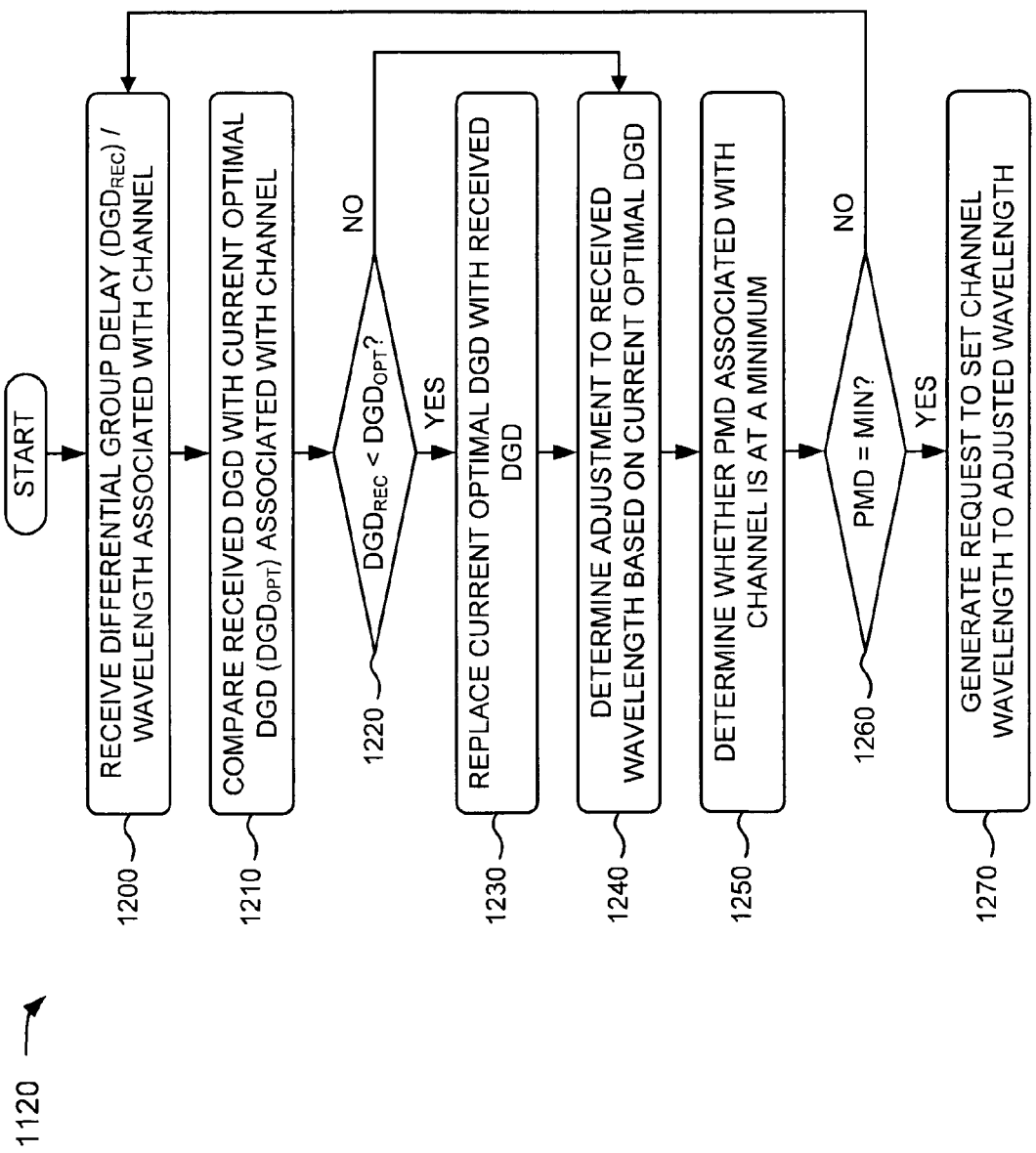

ENHANCED POLARIZATION MODE DISPERSION OF OPTICAL CHANNELS

BACKGROUND

Telecommunications carriers typically deploy optical fibers for transmitting optical signals from one point to another. Polarization mode dispersion (PMD) is a form of modal dispersion where two different polarizations of light in an optical fiber, which normally travel at the same speed, travel at different speeds due to random imperfections and asymmetries in the optical fiber. PMD causes random spreading of optical pulses, and creates problems for optical signals transmitted over the optical fiber. Unless compensated for, PMD ultimately limits the rate at which data can be transmitted over the optical fiber.

PMD splits an optical signal in the time domain along two polarization modes. PMD is an average value of a number of differential group delays (DGDs) observed when measuring an optical signal. DGD is a time separation or delay provided between the two polarization modes of the optical signal, and may be measured at an optical receiver. DGD is an instantaneous event and varies randomly with wavelength and time.

For a dense wavelength division multiplexing (DWDM) channel operating at a wavelength, the DGD changes with time. An optical channel may not experience degradation for a specified DGD value. For example, a ten (10) gigabits per second (G/s) data rate channel may be specified for a DGD value of thirty (30) picoseconds (ps). This means that the ten G/s channel may fail when the DGD value is more than thirty picoseconds. A DGD value greater than thirty picoseconds may occur, but may occur very infrequently (e.g., may occur less than 0.01% of the time). During less than 0.01% of the time, the ten G/s channel may not operate. Current systems are unable to eliminate or reduce channel inoperability for such a time period, and are unable to make the channel more tolerant of PMD for such a time period.

BRIEF DESCRIPTION OF THE DRAWINGS

FIGS. 11 and 12 depict flow charts of an exemplary process according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may adjust a wavelength of a channel (e.g., a DWDM channel capable of being generated and/or received by a network device) within a useable channel bandwidth in order to avoid high PMD and to operate the channel at a lowest PMD value. The performance of the channel may be continuously monitored at a receiver of a network device because the lowest PMD value of the channel may change over time. Such performance information may be continuously provided to a control system. As the lowest PMD value changes, the control system may request that a transmitter (e.g., of a network device generating the channel) adjust the channel wavelength to maintain the channel at the lowest PMD value at all times. Such an arrangement may enhance PMD tolerance for the channel without major changes to the transmitter and without a need for additional equipment (e.g., a PMD compensator).

In one implementation, for example, the systems and/or methods may receive, from a receiver (e.g., associated with a network device), performance information associated with a channel generated by a transmitter (e.g., associated with another network device). The systems and/or methods may determine, based on the performance information, a wavelength that minimizes polarization mode dispersion (PMD) associated with the channel. The systems and/or methods may provide, to the transmitter, a request to set the channel wavelength to the determined wavelength, and the transmitter may set the channel wavelength to the determined wavelength based on the request.

Figure 1:
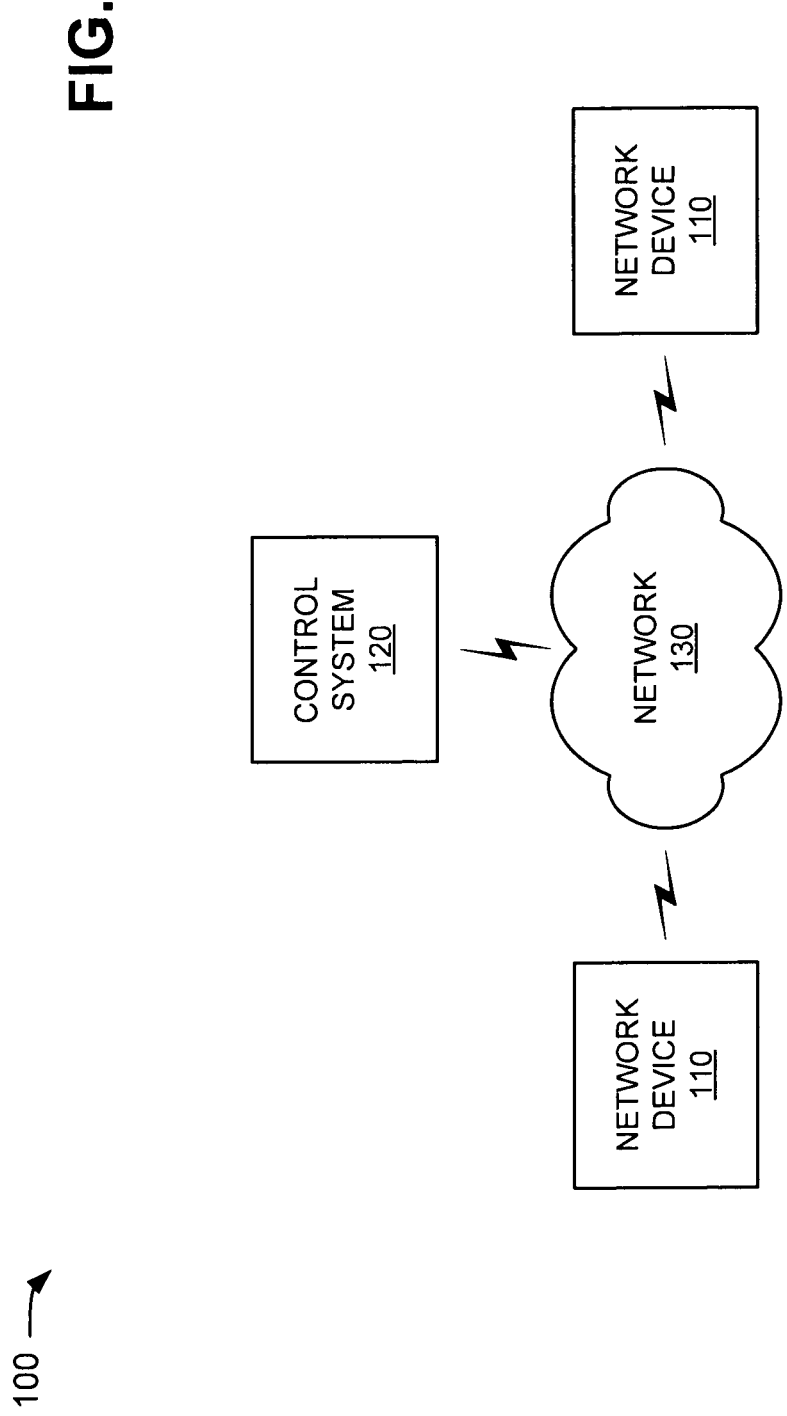
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include one or more network devices 110 and a control system 120 interconnected by a network 130. Components of network 100 may interconnect via wired and/or wireless connections. Two network devices 110, a single control system 120, and a single network 130 have been illustrated in FIG. 1 for simplicity. In practice, there may be more network devices 110, control systems 120, and/or networks 130. Also, in some instances, one or more of the components of network 100 may perform one or more functions described as being performed by another one or more of the components of network 100.

Each of network devices 110 may include a data transfer device, such as a gateway, a router, a switch, a firewall, a network interface card (NIC), a hub, a bridge, a proxy server, an optical add-drop multiplexer (OADM), or some other type of device that processes and/or transfers data. In one implementation, each of network devices 110 may be capable of establishing a channel that optically communicates information to another network device 110, via network 130. In another implementation, each of network devices 110 may include a device that is capable of transmitting information to and/or receiving information from control system 120 via network 130.

Control system 120 may include one or more server entities, or other types of computation or communication devices, that gather, process, search, and/or provide information in a manner described herein. In one implementation, control system 120 may receive, from a receiver (e.g., associated with a network device 110), performance information associated with a channel generated by a transmitter (e.g., associated with another network device 110). Control system 120 may determine, based on the performance information, a wavelength that minimizes polarization mode dispersion (PMD) associated with the channel, and may provide, to the transmitter, a request to set the channel wavelength to the determined wavelength. The transmitter may set the channel wavelength to the determined wavelength based on the request.

In another implementation, control system 120 may receive a differential group delay ($DGD_{REC}$) (e.g., received by the receiver) and a wavelength associated with the channel, and may compare the received DGD with a current optimal DGD ($DGD_{OPT}$) associated with the channel. If the received DGD is less than the current optimal DGD, control system 120 may replace the current optimal DGD with the received DGD. If the received DGD is not less than the current optimal DGD, control system 120 may not replace the current optimal DGD. Control system 120 may determine an adjustment to the received wavelength based on the current optimal DGD, and may determine whether the PMD value associated with the channel is at a minimum value. If the PMD value associated with the channel is at a minimum value, control system 120 may generate a request (e.g., provided to the transmitter) to set the channel wavelength to the adjusted wavelength. If the PMD value associated with the channel is not at a minimum value, control system 120 may repeat the aforementioned process.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. In one exemplary implementation, network 130 may include an optical transmission system (e.g., one or more transmission fibers) that may provide direct communication between an optical transmitter and an optical receiver. In one example, an embedded overhead channel of the optical transmission system may provide the direction communication between the optical transmitter and the optical receiver.

Figure 2:
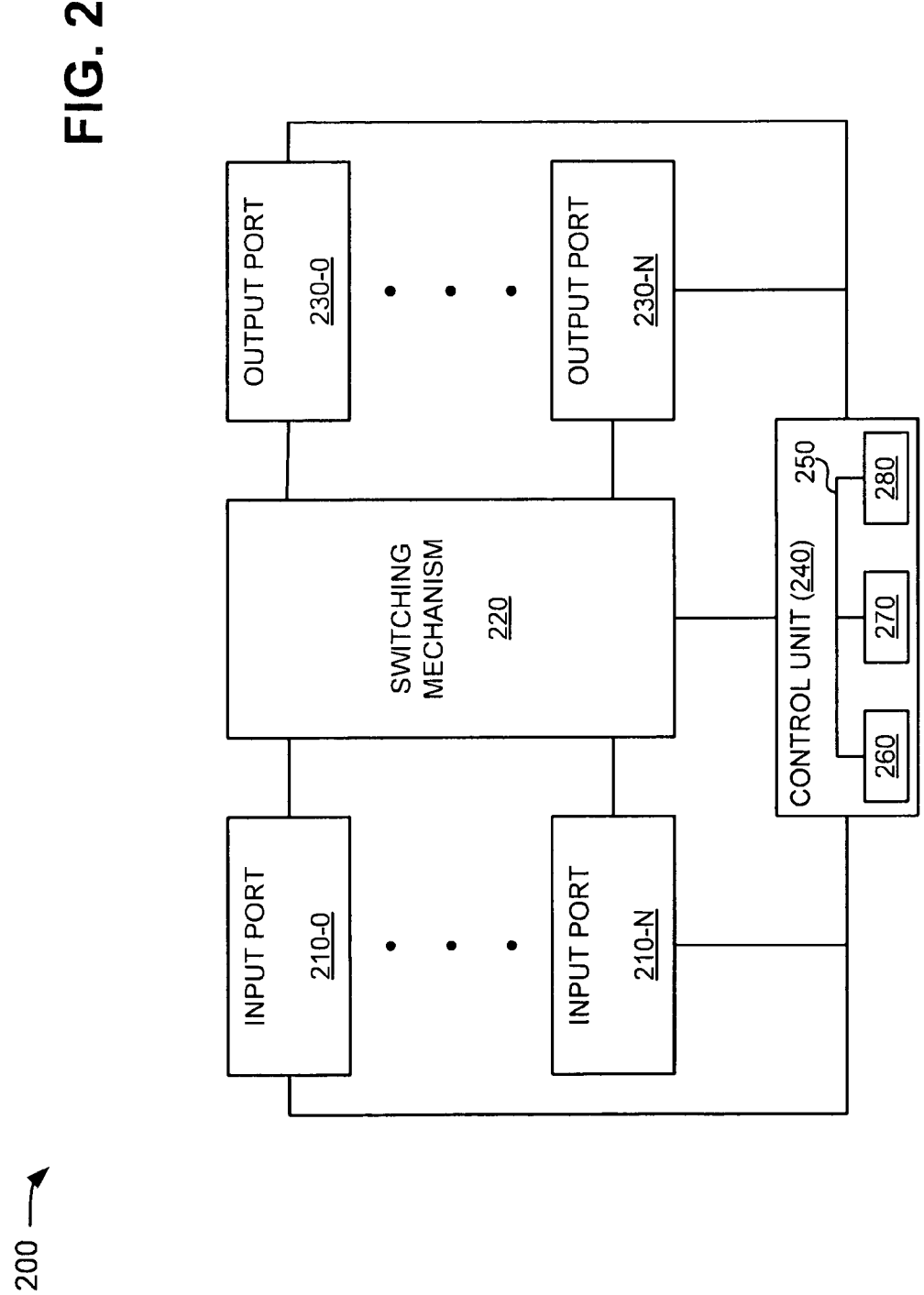
FIG. 2 illustrates a diagram of exemplary components of network devices depicted in FIG. 1.

FIG. 2 illustrates a diagram of exemplary components of a device 200 that may correspond to one of network devices 110 depicted in FIG. 1. As shown, device 200 may include input ports 210, a switching mechanism 220, output ports 230, and a control unit 240.

Input ports 210 may be the point of attachment for a physical link (not shown) and may be the point of entry for incoming data (e.g., provided by optical channels). Input ports 210 may carry out data link layer encapsulation and decapsulation. Input ports 210 may look up a destination address of incoming data in a forwarding table to determine its destination port (i.e., route lookup). In other implementations, input ports 210 may send (e.g., may be an exit point) and/or receive (e.g., may be an entry point) data.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store data and may schedule data for service on an output link (e.g., a link, not shown). Output ports 230 may include scheduling algorithms that support priorities and guarantees. Output ports 230 may support data link layer encapsulation and decapsulation, and/or a variety of higher-level protocols. In other implementations, output ports 230 may send (e.g., may be an exit point) and/or receive (e.g., may be an entry point) data.

Control unit 240 may use routing protocols and one or more forwarding tables for forwarding data. Control unit 240 may interconnect with input ports 210, switching mechanism 220, and output ports 230. Control unit 240 may compute a forwarding table, implement routing protocols, and/or run software to configure and manage device 200. Control unit 240 may handle any data whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Device 200 may perform certain operations, as described in detail below. Device 200 may perform these operations in response to processor 260 executing software instructions contained in a computer-readable medium, such as memory 270. A computer-readable medium may be defined as a physical or logical memory device. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
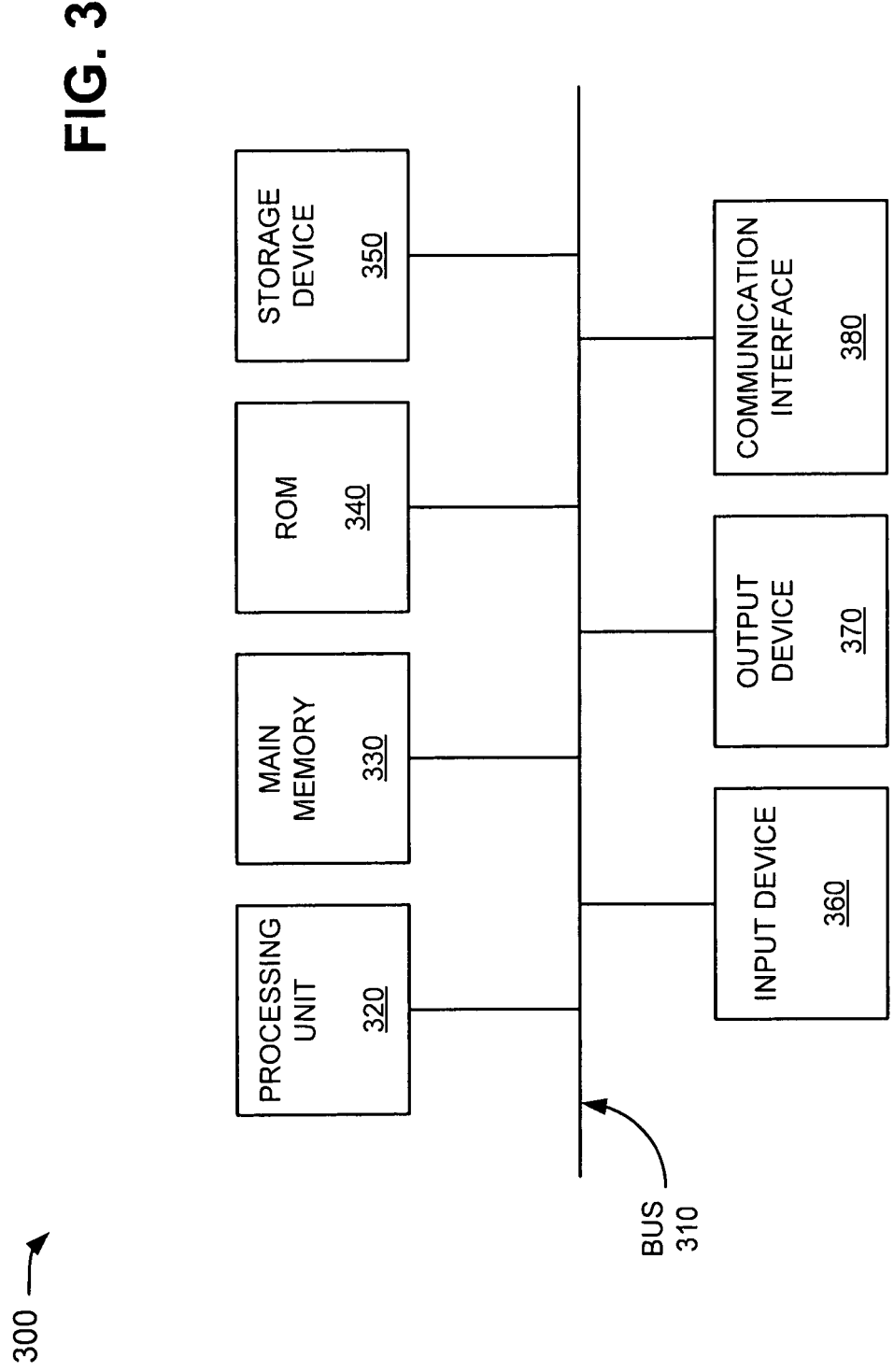
FIG. 3 depicts a diagram of exemplary components of a control system illustrated in FIG. 1.

FIG. 3 depicts a diagram of exemplary components of a device 300 that may correspond to control system 120. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include a processor, microprocessor, or other type of processing unit that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a remote control, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 130.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, or additional components than depicted in FIG. 3. In still other implementations, one or more components of device 300 may perform one or more other tasks described as being performed by one or more other components of device 300.

Figure 4:
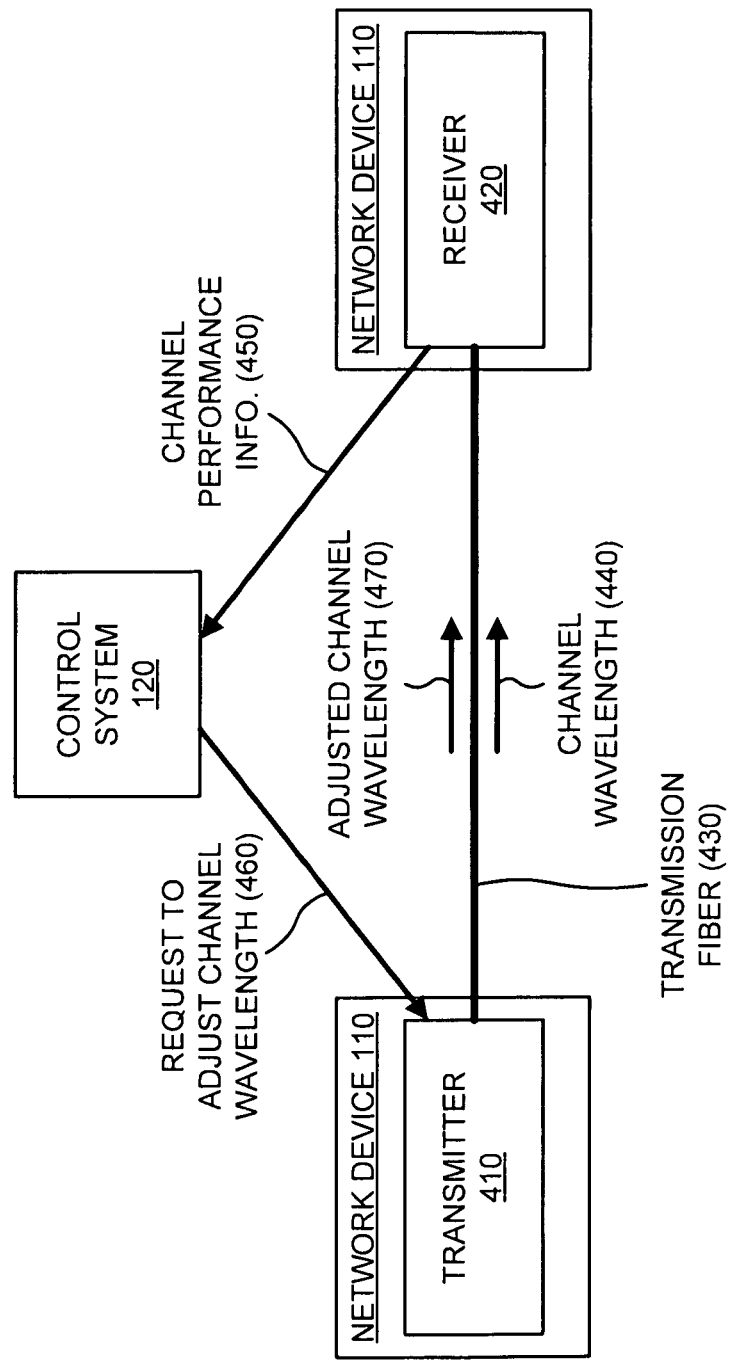
FIG. 4 illustrates a diagram of exemplary interactions among components of an exemplary portion of the network depicted in FIG. 1.

FIG. 4 illustrates a diagram of exemplary interactions among components of an exemplary portion 400 of network 100. As shown, exemplary network portion 400 may include network devices 110 and control system 120. Network devices 110 and control system 120 may include the features described above in connection with FIGS. 1-3. As further shown in FIG. 4, one network device 110 may include a transmitter 410, another network device 110 may include a receiver 420, and a transmission fiber 430 may interconnect transmitter 410 and receiver 420.

In one implementation, network devices 110, control system 120, and transmission fiber 430 may form a DWDM-based network, a high bit rate-based network, etc. In other implementations, network devices 110, control system 120, and transmission fiber 430 may form other types of optical-based networks. Furthermore, network devices 110 may be omitted from exemplary network portion 400, transmitter 410 may connect to a transmission end of an optical transmission system (e.g., transmission fiber 430), and receiver 420 may connect to a receive end of the optical transmission system (e.g., transmission fiber 430). Although not shown in FIG. 4, each of network devices 110 may include transmitter 410 and receiver 420, and information may be communicated in either direction between network devices 110.

Transmitter 410 may include an optical device capable of generating optical pulses at wavelengths within one or more channels (e.g., a channel wavelength 440) of an optical fiber based system (e.g., transmission fiber 430). Transmitter 410 may add one or more wavelength channels to an existing optical signal (e.g., an existing multi-wavelength WDM signal), and may transmit optical signals to transmission fiber 430.

Receiver 420 may include an optical device capable of receiving and de-multiplexing optical signals on a channel, separating and measuring arrival times of the optical pulses on the channel, and measuring channel performance based on the received information. Receiver 420 may provide performance information associated with each channel to control system 120, as shown by reference number 450. Channel performance information 450 may include a wavelength (e.g., channel wavelength 440), DGD values, PMD values, etc. associated with each channel.

Transmission fiber 430 may include a connection, a coupling, a link, or other similar mechanism by which optical signals, which may be carried by one optical component, may be imparted to a communicating optical component. For example, transmission fiber 430 may permit network devices 110 to optically communicate with each other, and may permit optical signals to be transmitted between network devices 110. "Optically communicating" devices may not necessarily be directly connected to one another and may be separated by intermediate optical components or devices. In one exemplary implementation, transmission fiber 430 may include one or more optical channels (e.g., generated by transmitter 410).

As further shown in FIG. 4, control system 120 may receive channel performance information 450 from receiver 420, and may determine, based on channel performance information 450, a wavelength that minimizes polarization mode dispersion (PMD) associated with the channel. Control system 120 may provide, to transmitter 410, a request 460 to adjust channel wavelength 440 to the determined wavelength. Transmitter 410 may set channel wavelength 440 to an adjusted channel wavelength 470 based on request 460.

In an exemplary implementation, control system 120 may receive a differential group delay ($DGD_{REC}$) (e.g. received by receiver 420) and channel wavelength 440 associated with the channel (e.g., via channel performance information 450), and may compare the received DGD with a current optimal DGD ($DGD_{OPT}$) associated with the channel. If the received DGD is less than the current optimal DGD, control system 120 may replace the current optimal DGD with the received DGD. If the received DGD is not less than the current optimal DGD, control system 120 may not replace the current optimal DGD. Control system 120 may determine an adjustment to channel wavelength 440 based on the current optimal DGD, and may determine whether the PMD value associated with the channel is at a minimum value. If the PMD value associated with the channel is at a minimum value, control system 120 may generate request 460 to adjust channel wavelength 440 to adjusted channel wavelength 470. If the PMD value associated with the channel is not at a minimum value, control system 120 may repeat the aforementioned process.

Transmitter 410 may adjust channel wavelength 440 for each channel so that the DGD and PMD values associated with each channel are minimized (e.g., transmitter 410 may increase a wavelength for a first channel by 0.08 nanometers (nm), may decrease a wavelength for a second channel by 0.12 nm, etc.). In one example, transmitter 410 may incrementally adjust channel wavelength 440 a small amount, and control system 120 may check channel performance information 450 to see if channel performance improves based on the adjustment. Such an incremental process may be continued until the DGD and PMD values associated with a channel are adequately minimized (e.g., so that a channel inoperability time period is less than 0.01%). However, since the lowest PMD value associated with a channel changes over time, control system 120 may continuously monitor channel performance information 450, and may continuously adjust channel wavelength 440 (e.g., via transmitter 410) in order to adequately minimize DGD and PMD values associated with the channel. Using the exemplary scenario described above, after a certain time period, transmitter 410 may, for example, decrease the wavelength for the first channel by 0.15 nm, may increase the wavelength for the second channel by 0.15 nm, etc.

Although FIG. 4 shows exemplary components of network portion 400, in other implementations, network portion 400 may contain fewer, different, or additional components than depicted in FIG. 4. In still other implementations, one or more components of network portion 400 may perform one or more other tasks described as being performed by one or more other components of network portion 400.

Figure 5:
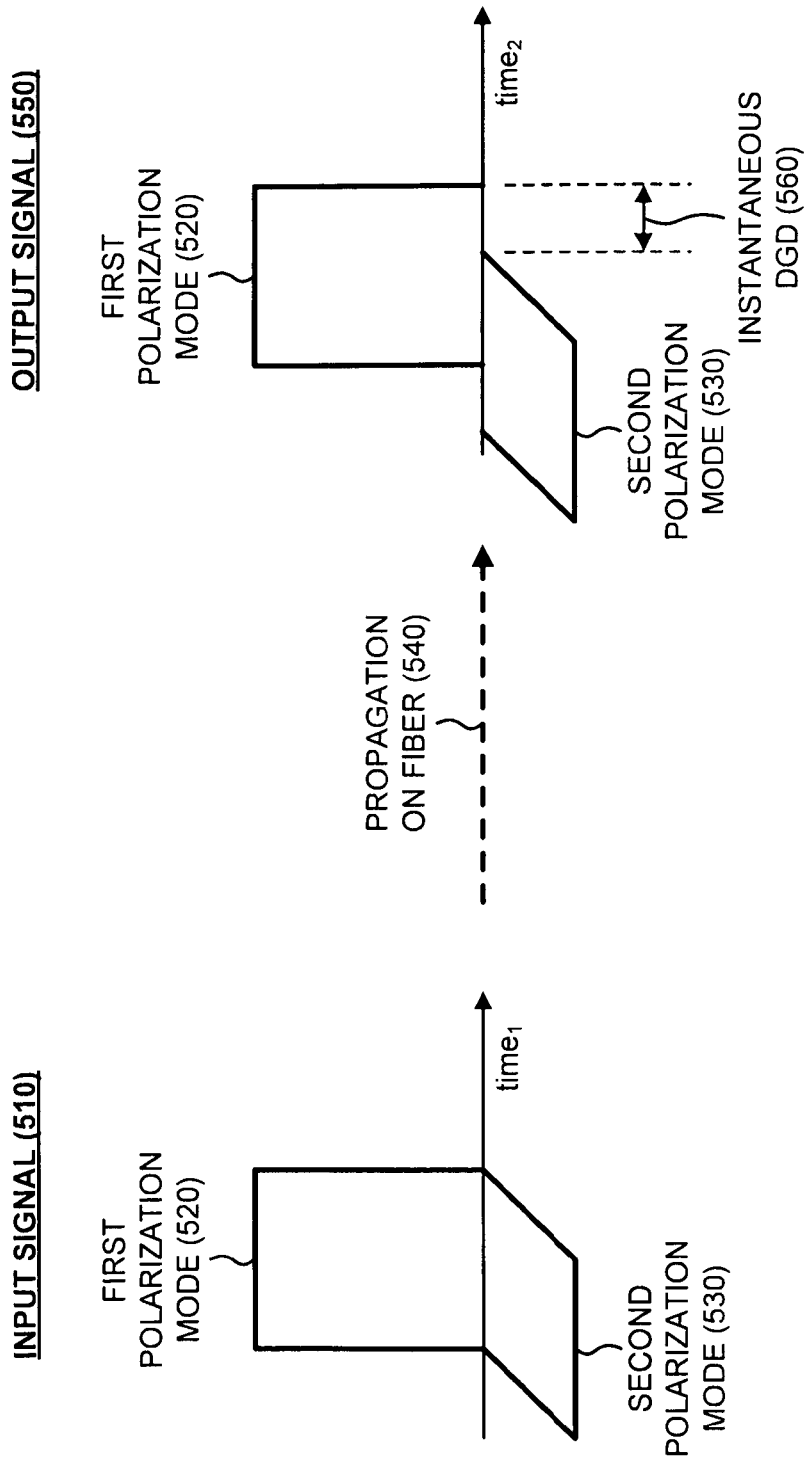
FIG. 5 depicts an exemplary diagram showing how polarization mode dispersion (PMD) splits an optical signal capable of being generated and/or received by a network device illustrated in FIG. 1.

FIG. 5 depicts an exemplary diagram 500 showing how polarization mode dispersion (PMD) splits an optical signal. As shown, an input signal 510 (e.g., provided by transmitter 410) may be provided at a first time (time$_1$) and may include a first polarization mode 520 and a second polarization mode 530. As input signal 510 propagates on fiber (e.g., transmission fiber 430), as indicated by reference number 540, PMD may split input signal 510 in the time domain along first and second polarization modes 520/530. Input signal 510 may arrive as output signal 550 at a receiver (e.g., receiver 420) and at a second time (time$_2$). Because of PMD, first polarization mode 520 of output signal 550 may be separated (e.g. in time) from second polarization mode 530 of output signal 550. Instantaneous DGD 560 may provide an indication of a time separation or delay between first and second polarization modes 520/530 of an optical signal, and may be measured at receiver 420. In one implementation, receiver 420 may provide instantaneous DGD 560 to control system 120 (e.g., via channel performance information 450).

A PMD specification associated with optical transmission equipment (e.g., transmitter 410) may be based on an assumption that a wavelength of a channel (e.g., channel wavelength 440) may adhere to a set of fixed wavelengths (e.g., called an International Telecommunications Union, Telecommunications Sector (ITU-T) grid). A channel may be slightly tunable along a wavelength, and there may be room for the channel to wander within an assigned bandwidth. On the other hand, the DGD values (e.g., instantaneous DGD 560) may change quite a bit within the channel bandwidth. Therefore, if the channel can be tuned (or adjusted) to find an optimal wavelength (e.g., that minimizes PMD and/or DGD) within the bandwidth, the operability of the channel may be much higher. Because PMD is a statistical phenomenon, the optimal wavelength may change over time and the channel tuning may need to be a continuous.

Figure 6:
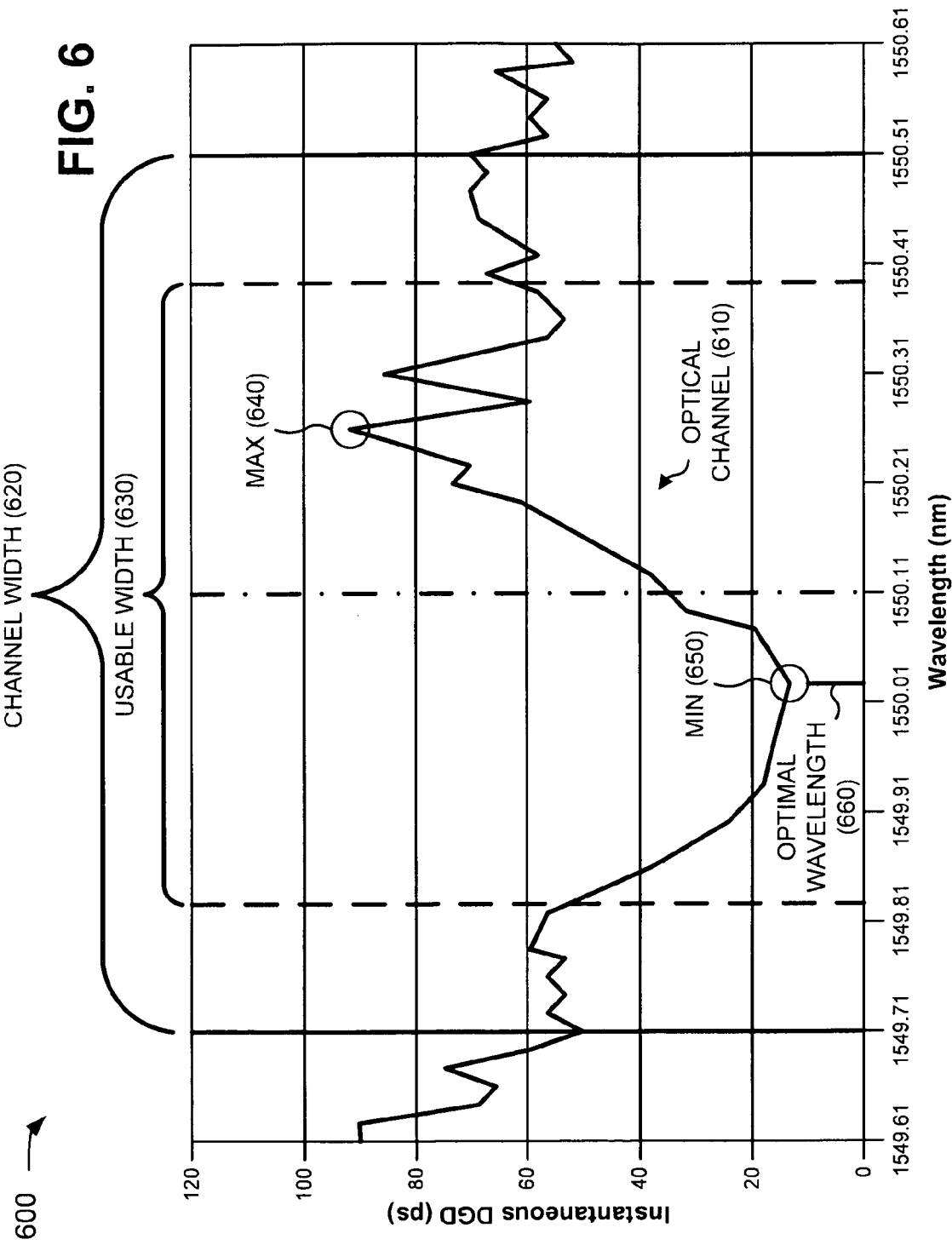
FIG. 6 illustrates a graph of a dense wavelength division multiplexing (DWDM) channel (at one point in time) capable of being generated and/or received by a network device depicted in FIG. 1.

FIG. 6 illustrates a graph 600 of instantaneous DGD associated with a dense wavelength division multiplexing (DWDM) channel at one point in time. As shown, graph 600 may include a representation of an optical channel 610, a channel width 620, a usable channel width 630, a maximum DGD 640, a minimum DGD 650, and an optimal wavelength 660. Instantaneous DGDs (in picoseconds) associated with optical channel 610 may be plotted along the "y" axis of graph 600, and wavelength (in nanometers) associated with optical channel 610 may be plotted along the "x" axis of graph 600.

Optical channel 610 may include a communications path derived from a specific transmission medium (e.g., transmission fiber 430). Optical channel 610 may support end-to-end communications of an information source (e.g., transmitter 410) and a destination (e.g., receiver 420). In one implementation, optical channel 610 may include a DWDM channel capable of being generated by transmitter 410 and/or received by receiver 420.

Channel width 620 may include an optical wavelength range of optical channel 610. For example, as shown in FIG. 6, channel width 620 may be 0.8 nm (or "100" GHz). Usable channel width 630 may include a usable optical wavelength range of optical channel 610. For example, as shown in FIG. 6, usable channel width 630 may be about 70% of channel width 620.

As further shown in FIG. 6, the instantaneous DGD values associated with optical channel 610 may vary within usable channel width 630, may include maximum DGD 640 of about "91" picoseconds within usable channel width 630, and may include minimum DGD 650 of about "15" picoseconds within usable channel width 630. Optical channel 610 may be adjusted (e.g., via control system 120 and transmitter 410) so that optical channel 610 operates at optimal wavelength 660 (e.g., "1550.05" nm). Optimal wavelength 660 may minimize DGD and/or PMD values associated with optical channel 610.

Figure 7:
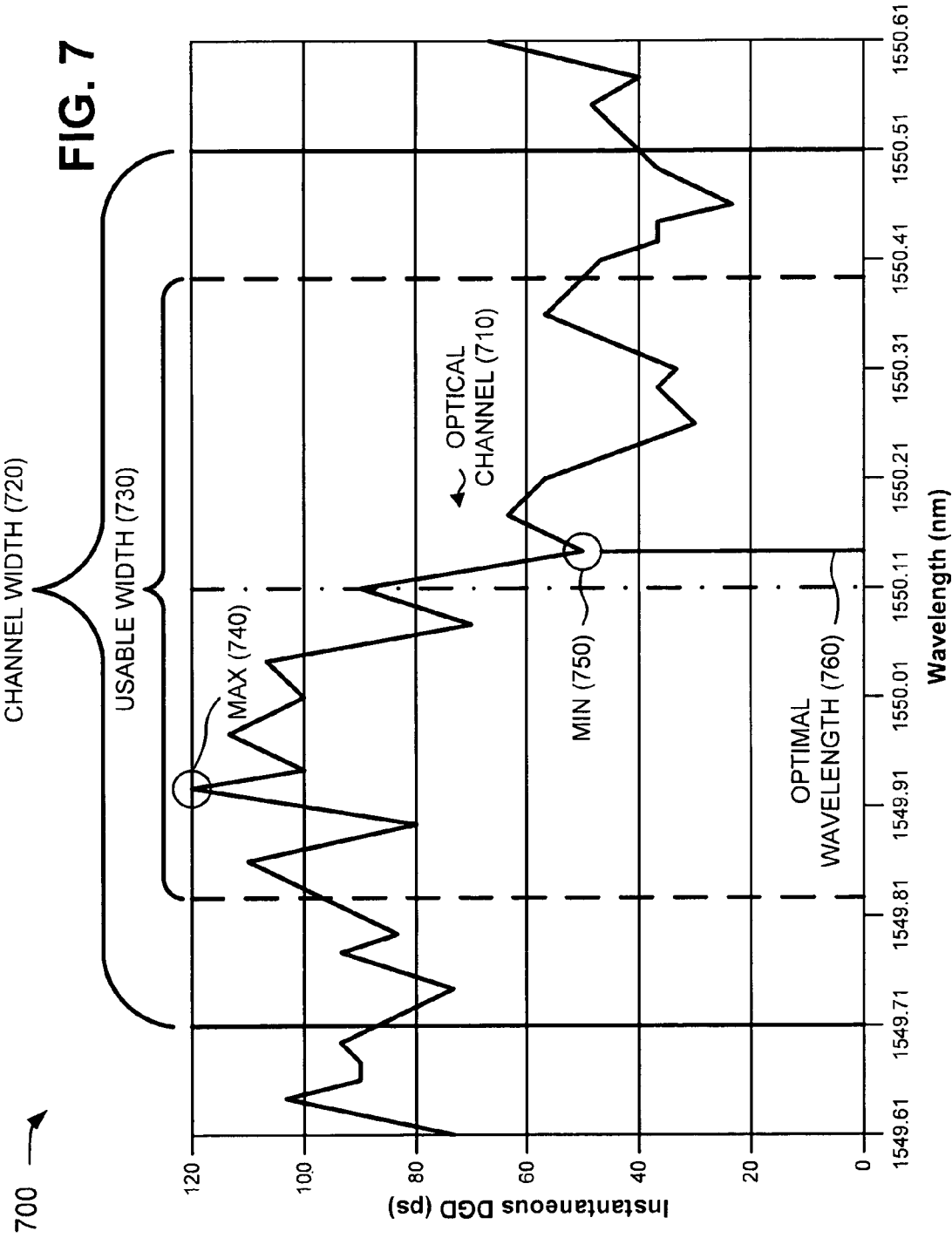
FIG. 7 depicts a graph of the DWDM channel illustrated in FIG. 6 at another point in time.

FIG. 7 depicts a graph 700 of instantaneous DGD associated with the DWDM channel depicted in FIG. 6 at another point in time. As shown, graph 700 may include a representation of an optical channel 710, a channel width 720, a usable channel width 730, a maximum DGD 740, a minimum DGD 750, and an optimal wavelength 760. Instantaneous DGDs (in picoseconds) associated with optical channel 710 may be plotted along the "y" axis of graph 700, and wavelength (in nanometers) associated with optical channel 710 may be plotted along the "x" axis of graph 700.

Optical channel 710 may include a communications path derived from a specific transmission medium (e.g., transmission fiber 430). Optical channel 710 may support end-to-end communications of an information source (e.g., transmitter 410) and a destination (e.g., receiver 420). In one implementation, optical channel 710 may include a DWDM channel capable of being generated by transmitter 410 and/or received by receiver 420. Optical channel 710 may be the same as optical channel 610, except at another point in time. PMD may cause the instantaneous DGD value associated with the optical channel (e.g., optical channel 610/710) to vary over time. Thus, optical channel 710 may include an instantaneous DGD profile that is different from the instantaneous profile associated with optical channel 610.

Channel width 720 may include an optical wavelength range of optical channel 710. For example, as shown in FIG. 7, channel width 720 may be 0.8 nm (or "100" GHz). Usable channel width 730 may include a usable optical wavelength range of optical channel 710. For example, as shown in FIG. 7, usable channel width 730 may be about 70% of channel width 720.

As further shown in FIG. 7, the instantaneous DGD values associated with optical channel 710 may vary within usable channel width 730, and may be different than the instantaneous DGD values associated with optical channel 610. For example, the instantaneous DGD values associated with optical channel 710 may include maximum DGD 740 of about "121" picoseconds within usable channel width 730, and may include minimum DGD 750 of about "30" picoseconds within usable channel width 730. Optical channel 710 may be adjusted (e.g., via control system 120 and transmitter 410) so that optical channel 710 operates at optimal wavelength 760 (e.g., "1550.25" nm). Optimal wavelength 760 may minimize DGD and/or PMD values associated with optical channel 710. Control system 120 and transmitter 410 may continuously adjust the optimal wavelength (e.g., optimal wavelength 660/760) based on the instantaneous DGD values associated with the optical channel (e.g., optical channel 610/710).

Figure 8:
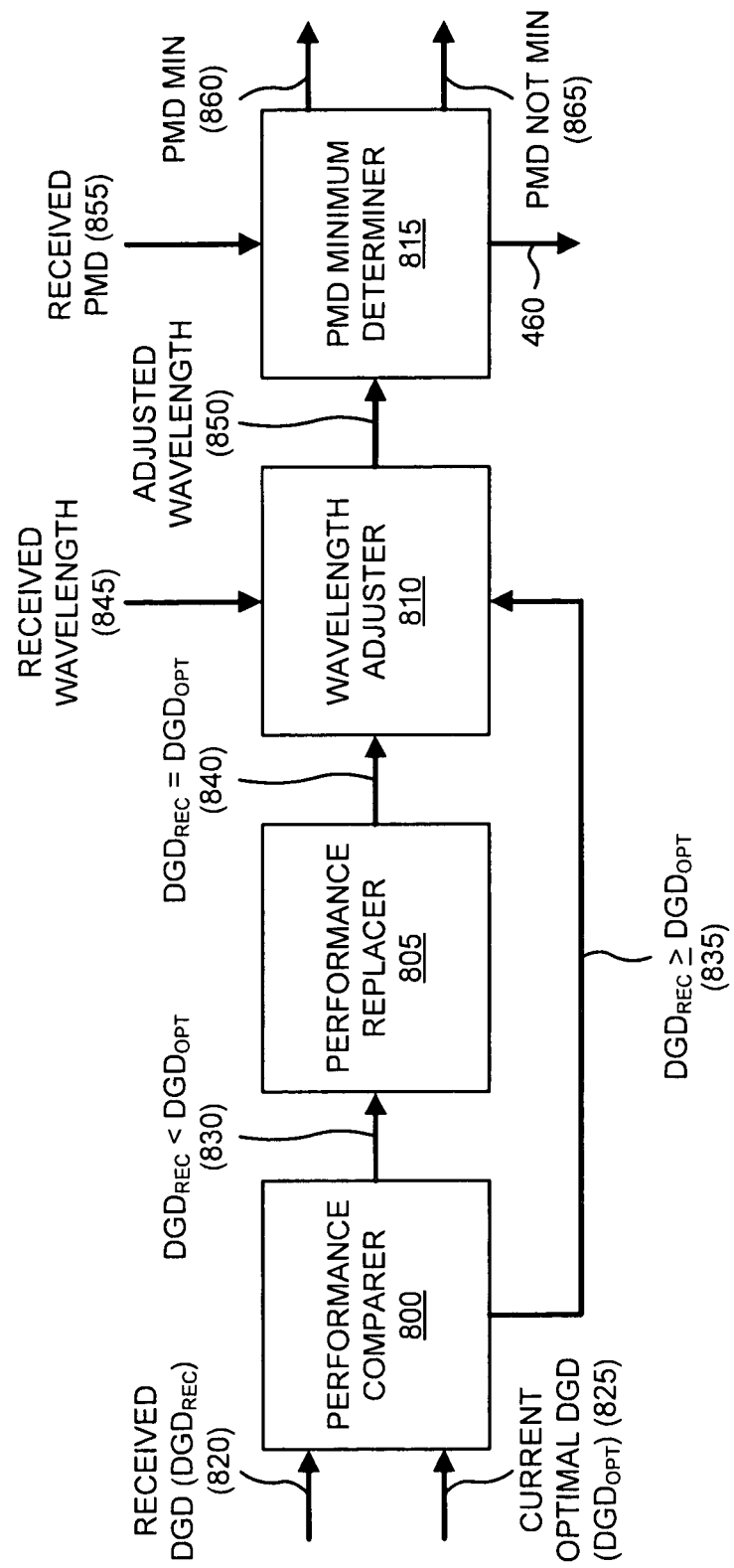
FIG. 8 illustrates a diagram of exemplary functional components of the control system depicted in FIG. 1.

FIG. 8 illustrates a diagram of exemplary functional components of control system 120. As shown, control system 120 may include a performance comparer 800, a performance replacer 805, a wavelength adjuster 810, and a PMD minimum determiner 815. In one implementation, the functions described in connection with FIG. 8 may be performed by processing unit 320 (FIG. 3).

Performance comparer 800 may include any hardware, software, or combination of hardware and software that may receive DGD ($DGD_{REC}$) 820 associated with a channel received by receiver 420, and may receive a current optimal DGD ($DGD_{OPT}$) 825 associated with the channel. Performance comparer 800 may compare received DGD ($DGD_{REC}$) 820 and current optimal DGD ($DGD_{OPT}$) 825. In one exemplary implementation, if performance comparer 800 determines that received DGD ($DGD_{REC}$) 820 is less than current optimal DGD ($DGD_{OPT}$) 825, performance comparer 800 may provide an indication 830 (e.g., $DGD_{REC} < DGD_{OPT}$) to performance replacer 805. In another exemplary implementation, if performance comparer 800 determines that received DGD ($DGD_{REC}$) 820 is greater than or equal to current optimal DGD ($DGD_{OPT}$) 825, performance comparer 800 may provide an indication 835 (e.g., $DGD_{REC} \geq DGD_{OPT}$) to wavelength adjuster 810.

Performance replacer 805 may include any hardware, software, or combination of hardware and software that may receive indication 830 from performance comparer 800, and may replace current optimal DGD ($DGD_{OPT}$) 825 with received DGD ($DGD_{REC}$) 820. Performance replacer 805 may provide, to wavelength adjuster 810, an indication 840 (e.g., $DGD_{REC} = DGD_{OPT}$) that current optimal DGD ($DGD_{OPT}$) 825 has been replaced with received DGD ($DGD_{REC}$) 820.

Wavelength adjuster 810 may include any hardware, software, or combination of hardware and software that may receive current optimal DGD ($DGD_{OPT}$) 825 (e.g., via indication 835) from performance comparer 800, or may receive the replaced current optimal DGD (e.g., via indication 840) from performance replacer 805. Wavelength adjuster 810 may receive a wavelength 845 (e.g., received by receiver 420) associated with the channel (e.g., channel wavelength 440), and may determine an adjustment to received wavelength 845 based on current optimal DGD ($DGD_{OPT}$) 825 or the replaced current optimal DGD, whichever is received by wavelength adjuster 810. Wavelength adjuster 810 may provide an adjusted wavelength 850 to PMD minimum determiner 815.

PMD minimum determiner 815 may include any hardware, software, or combination of hardware and software that may receive adjusted wavelength 850 from wavelength adjuster 810, and may receive a PMD 855 associated with the channel received by receiver 420. PMD minimum determiner 815 may determine whether received PMD 855 is at a minimum value. In one exemplary implementation, if PMD minimum determiner 815 determines that received PMD 855 is at a minimum value, as indicated by reference number 860, PMD minimum determiner 815 may provide (e.g., to transmitter 410) request 460 to adjust channel wavelength 440 to adjusted wavelength 850 (e.g., adjusted channel wavelength 470). In another exemplary implementation, if PMD minimum determiner 815 determines that received PMD 855 is not at a minimum value, as indicated by reference number 865, control system 120 may return to performance comparer 800, performance replacer 805, and wavelength adjuster 810, and may repeat the aforementioned functions.

Although FIG. 8 shows exemplary functional components of control system 120, in other implementations, control system 120 may contain fewer, different, or additional functional components than depicted in FIG. 8. In still other implementations, one or more functional components of control system 120 may perform one or more other tasks described as being performed by one or more other functional components of control system 120.

Figure 9:
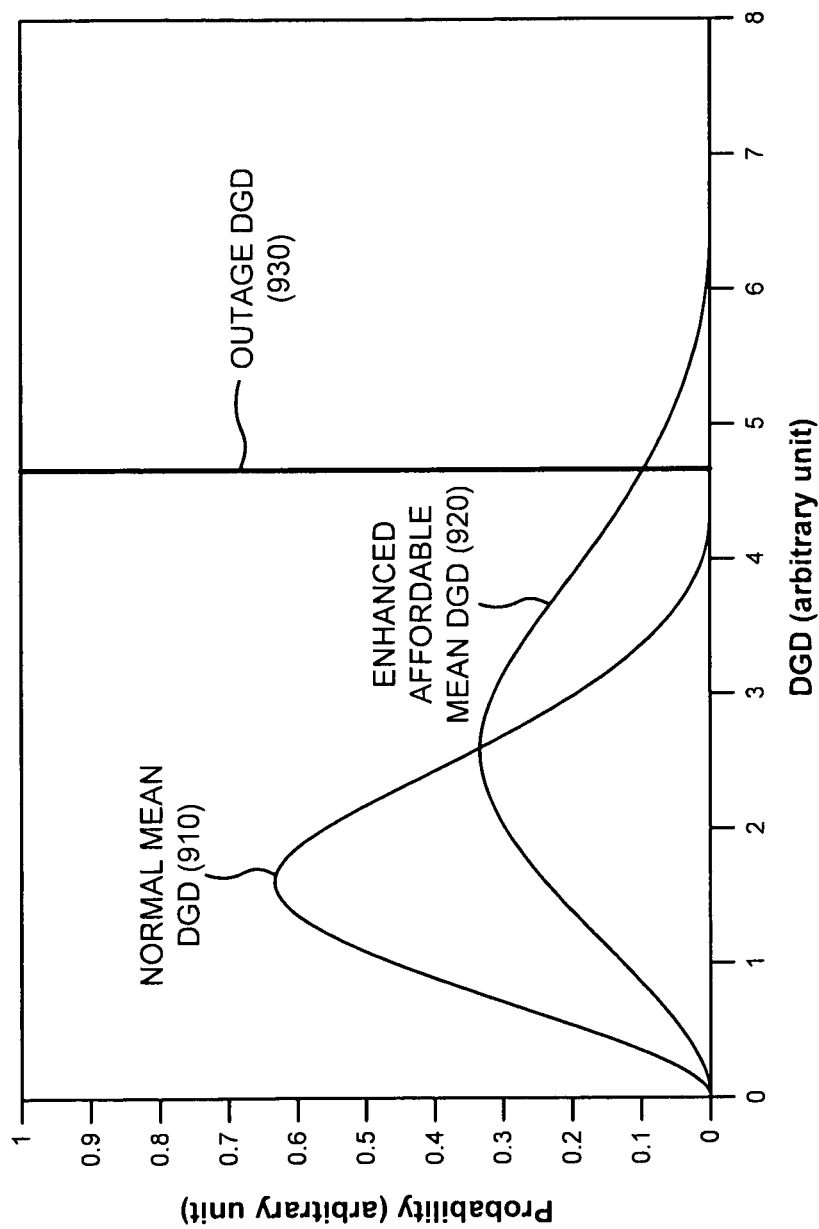
FIG. 9 depicts a graph showing an increase in an affordable mean differential group delay (DGD) for a channel according to implementations described herein.

FIG. 9 depicts a graph 900 showing an increase in an affordable mean differential group delay (DGD) for a channel according to implementations described herein. As shown, graph 900 may include a normal mean DGD 910, an enhanced affordable mean DGD 920, and an outage DGD 930 associated with a channel (e.g., a channel generated by transmitter 410 and/or received by receiver 420).

Normal mean DGD 910 may include a mean value of DGD associated with the channel when the enhanced PMD tolerance techniques described herein (e.g., in connection with, for example, FIGS. 4 and 8) are not applied to the channel. Enhanced affordable mean DGD 920 may include a mean value of DGD associated with the channel when the enhanced PMD tolerance techniques described herein are applied to the channel. Outage DGD 930 may include a value of DGD associated with the channel that results in channel inoperability.

In one example, it may be assumed that a usable bandwidth of the channel is about "30" GHz, that a bandwidth needed for a "10" G/s signal is "10" GHz, and that there are three usable frequency slots within the usable bandwidth. If the three usable frequency slots are assumed to be independent, the enhanced PMD tolerance techniques described herein may increase normal mean DGD 910 (e.g., by about 63%) to enhanced affordable mean DGD 920 by adjusting the channel wavelength to minimize PMD and/or DGD, while maintaining outage DGD 930 at a current level.

Figure 10:
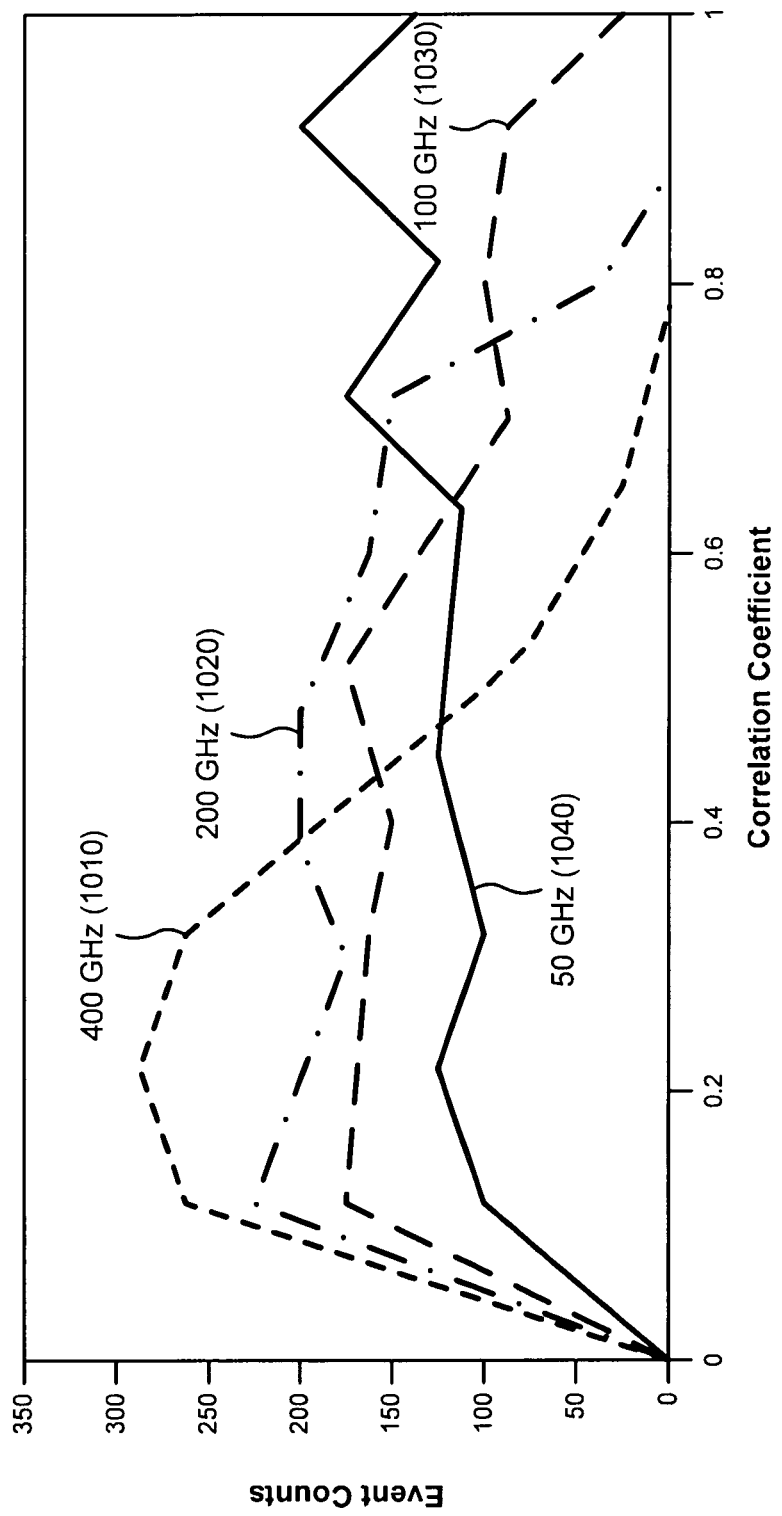
FIG. 10 illustrates a graph showing a DGD correlation for a channel according to implementations described herein.

FIG. 10 illustrates a graph 1000 showing a DGD correlation for a channel according to implementations described herein. As shown, graph 100 may include a "400" GHz channel spacing 1010, a "200" GHz channel spacing 1020, a "200" GHz channel spacing 1030, and a "50" GHz channel spacing 1040 associated with a channel (e.g., a channel generated by transmitter 410 and/or received by receiver 420). Each of channel spacings 1010-1040 may define a minimum space that may be made between two consecutive wavelengths used in optical transmission.

In one example, it may be assumed that a usable bandwidth of the channel is about "30" GHz, that a bandwidth needed for a "10" G/s signal is "10" GHz, and that there are three usable frequency slots within the usable bandwidth. As shown in FIG. 10, a DGD correlation function may not be completely de-correlated. Therefore, the three usable frequency slots may not be completely independent, and the increase of the normal mean DGD to the enhanced affordable mean DGD may be less than described above in connection with FIG. 9 (e.g., less than 63%). Since the DGD correlation function may be evenly distributed for "50" GHz channel spacing 1040, the enhanced PMD tolerance techniques described herein may increase normal mean DGD 910 (e.g., by about 30%) to enhanced affordable mean DGD 920 by adjusting the channel wavelength to minimize PMD and/or DGD.

Figure 11:
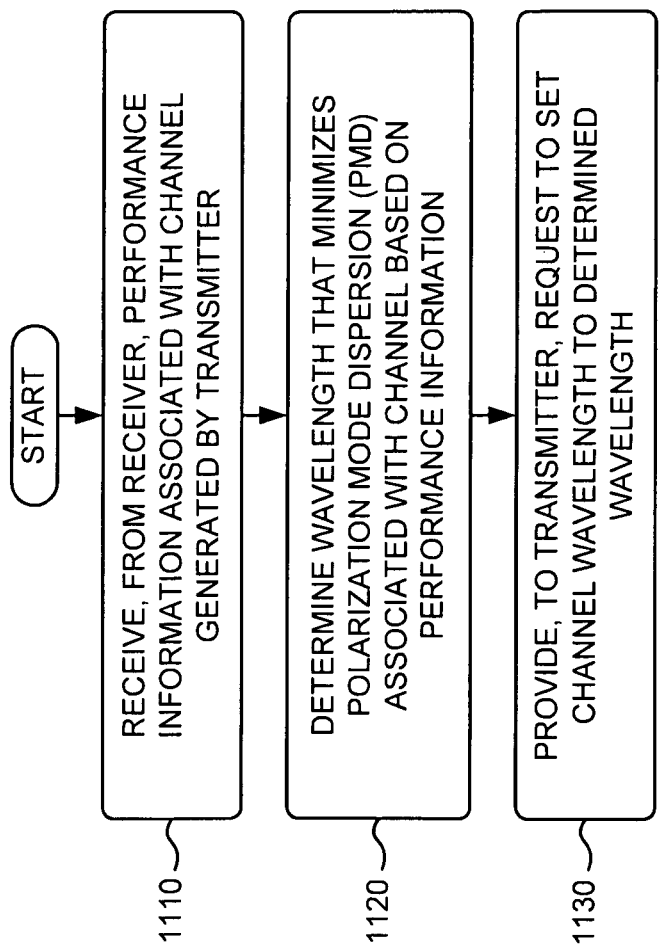

FIG. 11 depicts a flow chart of an exemplary process 1100 for adjusting a wavelength of an optical channel in order to operate the channel at a lowest PMD value according to implementations described herein. In one implementation, process 1100 may be performed by control system 120. In another implementation, some or all of process 1100 may be performed by another device or group of devices, including or excluding control system 120.

As illustrated in FIG. 11, process 1100 may begin with receipt, from a receiver, of performance information associated with a channel generated by a transmitter (block 1110), and determination of a wavelength that minimizes polarization mode dispersion (PMD) associated with the channel based on the performance information (block 1120). For example, in implementations described above in connection with FIG. 4, control system 120 may receive channel performance information 450 from receiver 420, and may determine, based on channel performance information 450, a wavelength that minimizes polarization mode dispersion (PMD) associated with the channel.

As further shown in FIG. 11, a request to set a channel wavelength to the determined wavelength may be provided to the transmitter (block 1130). For example, in implementations described above in connection with FIG. 4, control system 120 may provide, to transmitter 410, request 460 to adjust channel wavelength 440 to the determined wavelength. Transmitter 410 may set channel wavelength 440 to adjusted channel wavelength 470 based on request 460.

Process block 1120 may include the process blocks depicted in FIG. 12. As shown in FIG. 12, process block 1120 may include receiving a differential group delay ($DGD_{REC}$) and/or a wavelength associated with the channel (block 1200), and comparing the received DGD with a current optimal DGD ($DGD_{OPT}$) associated with the channel (block 1210). For example, in implementations described above in connection with FIG. 8, control system 120 may include performance comparer 800. Performance comparer 800 may receive DGD ($DGD_{REC}$) 820 associated with a channel received by receiver 420, and may receive current optimal DGD ($DGD_{OPT}$) 825 associated with the channel. Performance comparer 800 may compare received DGD ($DGD_{REC}$) 820 and current optimal DGD ($DGD_{OPT}$) 825.

As further shown in FIG. 12, process block 1120 may include determining whether the received DGD is less than the current optimal DGD (block 1220). If the received DGD is less than the current optimal DGD (block 1220—YES), the current optimal DGD may be replaced with the received DGD (block 1230) and an adjustment to the received wavelength may be determined based on the replaced current optimal DGD (block 1240). Otherwise (block 1220—NO), an adjustment to the received wavelength may be determined based on the current optimal DGD (block 1240). For example, in implementations described above in connection with FIG. 8, if performance comparer 800 determines that received DGD ($DGD_{REC}$) 820 is less than current optimal DGD ($DGD_{OPT}$) 825, performance comparer 800 may provide indication 830 (e.g., $DGD_{REC} < DGD_{OPT}$) to performance replacer 805 of control system 120. Otherwise, performance comparer 800 may provide indication 835 (e.g., $DGD_{REC} \geq DGD_{OPT}$) to wavelength adjuster 810 of control system 120. Performance replacer 805 may replace current optimal DGD ($DGD_{OPT}$) 825 with received DGD ($DGD_{REC}$) 820. Wavelength adjuster 810 may determine an adjustment to received wavelength 845 based on current optimal DGD ($DGD_{OPT}$) 825 or the replaced current optimal DGD, whichever is received by wavelength adjuster 810.

Returning to FIG. 12, it may be determined whether the PMD associated with the channel is at a minimum (block 1250). If the PMD associated with the channel is at the minimum (block 1260—YES), a request to set the channel wavelength to the adjusted wavelength may be generated (block 1270). Otherwise (block 1260—NO), process block 1120 may return to process block 1200. For example, in implementations described above in connection with FIG. 8, PMD minimum determiner 815 of control system 120 may determine whether received PMD 855 is at a minimum value. If PMD minimum determiner 815 determines that received PMD 855 is at a minimum value, as indicated by reference number 860, PMD minimum determiner 815 may provide (e.g., to transmitter 410) request 460 to adjust channel wavelength 440 to adjusted wavelength 850 (e.g., adjusted channel wavelength 470). If PMD minimum determiner 815 determines that received PMD 855 is not at a minimum value, as indicated by reference number 865, control system 120 may repeat the aforementioned functions.

Systems and/or methods described herein may adjust a wavelength of a channel within a useable channel bandwidth in order to avoid high PMD and to operate the channel at a lowest PMD value. The performance of the channel may be continuously monitored at a receiver of a network device because the lowest PMD value of the channel may change over time. Such performance information may be continuously provided to a control system. As the lowest PMD value changes, the control system may request that a transmitter adjust the channel wavelength to maintain the channel at the lowest PMD value at all times. Such an arrangement may enhance PMD tolerance for the channel without major changes to the transmitter and without a need for additional equipment.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 11 and 12, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A computing device-implemented method, comprising:
receiving, from an optical receiver, performance information associated with an optical channel generated by an optical transmitter, where the performance information is associated with operating the optical channel, during a first time period, at a first wavelength, and where the performance information includes a received differential group delay ($DGD_{REC}$) associated with the optical channel at the first wavelength during the first time period;

determining, based on the received performance information and the first wavelength, a second wavelength, where determining the second wavelength includes:

identifying an optimal differential group delay ($DGD_{OPT}$) associated with the optical channel, where the $DGD_{OPT}$ is a smallest differential group delay value observed on the optical channel prior to the first time period, and where the $DGD_{OPT}$ is associated with a particular wavelength, comparing the $DGD_{REC}$ to the $DGD_{OPT}$, determining, when the $DGD_{REC}$ is less than the $DGD_{OPT}$, the second wavelength based on the first wavelength, and determining, when the $DGD_{REC}$ is not less than the $DGD_{OPT}$, the second wavelength based on the particular wavelength; and providing, to the optical transmitter, a request to adjust an optical channel wavelength to the determined second wavelength, where the optical transmitter adjusts the optical channel wavelength, during a second time period that is after the first time period, to the determined second wavelength based on the request.

2. The computing device-implemented method of claim 1, where the computing device comprises a control system coupled to the optical transmitter and the optical receiver.

3. The computing device-implemented method of claim 1, where the optical channel comprises a dense wavelength division multiplexing (DWDM) channel.

4. The computing device-implemented method of claim 1, where the performance information further comprises at least one of:

the optical channel wavelength, or a polarization mode dispersion (PMD) associated with the optical channel.

5. The computing device-implemented method of claim 1, where identifying the second wavelength includes:

determining a proposed wavelength based on the $DGD_{REC}$;

identifying a minimum polarization mode dispersion ($PMD_{MIN}$) associated with the optical channel, where the $PMD_{MIN}$ is a smallest PMD value observed on the optical channel prior to the first time period;

determining whether a polarization mode dispersion associated with the optical channel at the proposed wavelength ($PMD_{PROPOSED}$) is equal to the $PMD_{MIN}$;

selecting, when the $PMD_{PROPOSED}$ is equal to the $PMD_{MIN}$, the new wavelength as the second wavelength; and when the $PMD_{PROPOSED}$ is greater than the $PMD_{MIN}$:

modifying the proposed wavelength based on the $PMD_{MIN}$, and identifying the second wavelength based on the modified proposed wavelength.

6. The computing device-implemented method of claim 1, where the determined second wavelength is associated with a minimum polarization mode dispersion (PMD) and a minimum differential group delay (DGD) respectively, of possible PMDs and possible DGDs associated with a useable bandwidth of the optical channel.

7. The computing device-implemented method of claim 1, where the optical receiver is provided in a first network device and the optical transmitter is provided in a second network device.

8. The computing device-implemented method of claim 7, where each of the first network device and the second network device comprises one or more of:

a gateway, a router, a switch, a firewall, a network interface card (NIC), a hub, a bridge, a proxy server, or an optical add-drop multiplexer (OADM).

9. A device, comprising:

a memory to store a plurality of instructions; and a processor to execute instructions in the memory to:

receive, from an optical receiver, performance information associated with an optical channel generated by an optical transmitter, where the performance information is associated with operating the optical channel at a first wavelength, and where the performance information includes a differential group delay ($DGD_{REC}$) associated with the optical channel at the first wavelength, determine, based on the received performance information and the first wavelength, a second wavelength that reduces polarization mode dispersion (PMD) associated with the optical channel, where the processor, when determining the second wavelength, is further to:

identify an optimal differential group delay ($DGD_{OPT}$) associated with the optical channel, where the $DGD_{OPT}$ is a smallest differential group delay value previously observed on the optical channel, compare the $DGD_{REC}$ with the $DGD_{OPT}$, determine, when the $DGD_{REC}$ is less than the $DGD_{OPT}$, the second wavelength based on the first wavelength, and determine, when the $DGD_{REC}$ is not less than the $DGD_{OPT}$, the second wavelength based on a particular wavelength associated with the $DGD_{OPT}$, and provide, to the optical transmitter, a request to adjust an optical channel wavelength to the determined second wavelength.

10. The device of claim 9, where the device comprises a control system coupled to the optical transmitter and the optical receiver.

11. The device of claim 9, where the optical channel comprises a dense wavelength division multiplexing (DWDM) channel.

12. The device of claim 9, where the performance information further comprises at least one of:

the optical channel wavelength, or the PMD associated with the optical channel.

13. The device of claim 9, where processor further executes instructions in the memory to:

determine whether the PMD associated with the optical channel, at the second wavelength, can be reduced, and generate a request to adjust the second wavelength when the PMD associated with the optical channel, at the second wavelength, can be reduced.

14. The device of claim 9, where the determined second wavelength is associated with a minimum PMD and a minimum DGD respectively, of possible PMDs and possible DGDs associated with a useable bandwidth of the optical channel.

15. A system, comprising:

means for determining performance information associated with an optical channel, where the performance information is associated with operating, at a first wavelength, the optical channel between an optical transmitter and an optical receiver, and where the performance information includes a differential group delay (DGD) associated with the optical channel at the first wavelength;

means for determining, based on the received performance information and the first wavelength, a second wavelength, where the means for determining the second wavelength includes:

means for identifying an optimal differential group delay ($DGD_{OPT}$) associated with the optical channel, where the $DGD_{OPT}$ is a smallest differential group delay value observed on the optical channel prior to the first time period, and where the $DGD_{OPT}$ is associated with a particular wavelength, means for comparing the $DGD_{REC}$ to the $DGD_{OPT}$, means for determining, when the $DGD_{REC}$ is less than the $DGD_{OPT}$, the second wavelength based on the first wavelength, and means for determining, when the $DGD_{REC}$ is not less than the $DGD_{OPT}$, the second wavelength based on the particular wavelength; and means for causing the optical transmitter to adjust an optical channel wavelength to the determined second wavelength.

16. The system of claim 15, further comprising:
means for determining whether polarization mode dispersion (PMD) associated with the optical channel, at the second wavelength, can be reduced, and
means for generating a request to adjust the second wavelength when the PMD associated with the optical channel, at the second wavelength, can be reduced.

17. The system of claim 15, where the system is included in a control system coupled to the optical transmitter and the optical receiver.

18. The system of claim 15, where the optical channel comprises a dense wavelength division multiplexing (DWDM) channel.

19. The system of claim 15, where the performance information further comprises at least one of:
the optical channel wavelength, or
the PMD value associated with the optical channel.

20. The system of claim 15, where the determined second wavelength is associated with a minimum PMD and a minimum DGD respectively, of possible PMDs and possible DGDs associated with a useable bandwidth of the optical channel.

* * * * *